United States Patent [19] [11] 3,740,068
Arata [45] June 19, 1973

[54] STEERING COLUMN SUPPORT ASSEMBLY
[75] Inventor: Jiro Arata, Aichi-ken, Japan
[73] Assignee: Toyota Jidosha Kogyo Kabushiki Kaisha, Toyota-shi, Aichi-ken, Japan
[22] Filed: Feb. 3, 1971
[21] Appl. No.: 112,302

[30] Foreign Application Priority Data
Feb. 7, 1970  Japan.............................. 45/10382

[52] U.S. Cl.............. 280/87 A, 74/493, 180/82 R, 188/1 C
[51] Int. Cl............................................. B62d 1/18
[58] Field of Search...................... 280/87 R, 87 A; 180/82; 188/1 C; 74/492, 493

[56] References Cited
UNITED STATES PATENTS

| 3,612,223 | 10/1971 | Shiomi et al. | 188/1 C |
| 3,392,599 | 7/1968 | White | 280/87 R X |
| 3,492,888 | 2/1970 | Nishimura et al. | 280/87 R X |
| 3,301,351 | 1/1967 | Platus et al. | 188/1 C |
| 3,373,965 | 3/1968 | Bien et al. | 74/493 X |
| 3,415,140 | 12/1968 | Bien et al. | 180/82 X |
| 3,538,785 | 11/1970 | Grancon | 180/1 C X |
| 3,538,783 | 11/1970 | Butts | 188/1 C |
| 3,461,740 | 8/1969 | Tajima et al. | 74/492 |
| 3,195,686 | 7/1965 | Johnson | 188/1 C |

Primary Examiner—Leo Friaglia
Assistant Examiner—John P. Silverstrim
Attorney—John J. McGlew and Alfred E. Page

[57] ABSTRACT

A steering column support assembly comprises holding pieces, steel balls, and a bracket. The holding pieces are secured to a beam member of a vehicle body by means of bolts and nuts. The steel balls placed in the grooves formed by the holding pieces are pressed by the holding pieces, thus holding the bracket wing portions which are substantially parallel to the shaft of the steering column. The bracket fixes the upper jacket of the steering column and is provided with a flange which is brought into contact with the front end of a holding piece when the steering column is moved backward. In order to absorb the axial impact energy applied to the steering column in the event of a crash, the steering column, supported in an axially movable manner, is supported by the stable engaging force developed by the steel balls. Upon the occurrence of a crash, the steering column is moved forward together with the bracket, while rolling the steel balls. The flange prevents the steering column from coming out in the backward direction.

4 Claims, 8 Drawing Figures

INVENTOR.
JIRO ARATA
BY McBlew + Tuttle

INVENTOR.
JIRO ARATA

INVENTOR
JIRO ARATA
BY
McBlew & Tuttle

STEERING COLUMN SUPPORT ASSEMBLY

FIELD OF THE INVENTION

This invention relates to a steering column support assembly for use with automobiles and particularly to an assembly which supports the steering column, including a steering wheel, so that it can be moved forward when a predetermined axial load is applied, thus preventing a vehicle driver from being injured in his breast or the like when he has been thrown forward against the steering wheel in the event of a vehicle crash.

BACKGROUND OF THE PRIOR ART

In the prior art, the bracket attached to the steering column is connected by a shear pin to a supporting beam or hanging bolt made integral with the vehicle body in order that the steering column is fixedly supported at the vehicle body under the normal condition of use in such a manner as not to cause any inconvenience in driving operation, and so that the steering column can be released from the vehicle body when a load applied by a vehicle driver, upon the occurrence of a collision, exceeds a predetermined value. This shear pin is made by injection molding of synthetic resin such as polyacetal. Such a shear pin is, however, liable to deterioration of its bonding force due to secular variation. Also, an injection molding machine is required to make the pins, and therefore a high degree of technique and longer time are required to manufacture the pins. Consequently, the cost of the steering support assembly becomes comparatively high.

SUMMARY OF THE INVENTION

The object of this invention is to provide a steering column support assembly wherein organic material such as synthetic resin is not used and therefore secular variation is eliminated. Such a steering column support assembly is capable of performing stable support over a long period of time and capable of putting a crash energy absorbing means into operation effectively by releasing the steering column including the steering wheel from the instrument panel smoothly when the load applied to the steering column by a vehicle driver exceeds a predetermined value upon the occurrence of a collision of the driver with the steering wheel (secondary crash) which occurs following a vehicle crash, i.e., a crash of the vehicle front into an obstacle (primary crash). Another object of this invention is to provide a steering column support assembly which is simple in construction and easy in assembly, thus reducing the manufacturing cost of such support assembly. A further object of this invention is to provide a steering column support assembly wherein the protrusion of the steering column into the vehicle interior is prevented by a simple construction, thus preventing the steering column from protruding into the driver's compartment in the event of a crash between the vehicle front and an obstacle, i.e., primary crash.

The invention is directed to steering assemblies wherein a steering column is supported at a fixed member at the vehicle body side in an axially movable manner and the axial impact energy applied to the steering column is absorbed by energy absorbing members. The steering column support assembly according to this invention comprises a bracket having wing portions that are substantially parallel to the shaft of the steering column installed in the steering column and rolling elements disposed between the fixed member at the vehicle body side and at least one surface of said wing portions of the bracket, thereby to hold said bracket wing portions and the fixed member by pressing, thus obtaining an axial engaging force by developing plastic deformation in the wing portions and at least one of said fixed members by means of the rolling elements.

In addition, according to this invention, the bracket is provided with a flange which can be brought into contact with the axial end plane of said fixed member. By virtue of such construction, the protrusion of the steering column into the vehicle room side can be easily prevented.

DESCRIPTION OF A PREFERRED EMBODIMENT

This invention will be described in detail with reference to the accompanying drawings.

Figure 1:
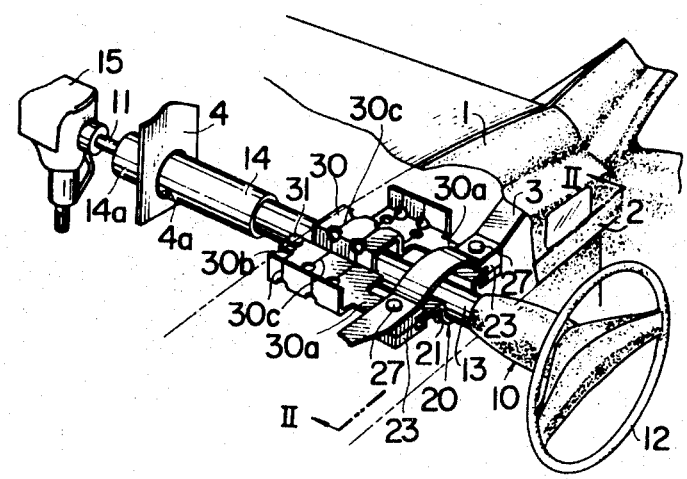
FIG. 1 is a perspective view, partly broken away, illustrating the construction of a steering column assembly provided with the steering column support assembly according to this invention.

Referring now to FIG. 1, the reference numeral 1 identifies a body of a vehicle such as an automobile or the like. The reference numeral 2 designates an instrument panel provided at the front of a passenger compartment; 3 a beam member whose both ends are secured to supporting frames on the opposite sides of the vehicle body 1; and 4 a cowl dividing the engine compartment from the passenger compartment. A steering column 10 is installed so as to penetrate through the instrument panel 2 and the cowl 4. The steering column 10 comprises a steering shaft 11, an upper jacket 13 and a lower jacket 14 embracing the steering shaft 11 concentrically, and a steering wheel 12 connected to the rear end of the shaft 11. The reference numeral 15 identifies a steering gear box.

The upper jacket 13 and the lower jacket 14 are telescopically engaged and they are relatively slidable in the axial direction. Although not shown in FIG. 1, the shaft 11 also comprises two shafts which are telescopically connected to each other by insertion so as to enable torque transmission. The steering wheel 12 and the upper jacket 13 move as one body in the axial direction, but the steering wheel 12 is rotatable relative to the upper jacket 13. The lower jacket 14 supports the shaft 11 rotatably at the forward end thereof, but is moved as one body with the shaft in the axial direction and is guided by the hole 4a of the cowl 4.

A bracket 21, which is arcuately bent so as to embrace the lower surface of the upper jacket 13, is attached to the upper jacket 13 by means of bolts 22. On the other hand, holding pieces or retainers 23 are fixed to the lower surface of the beam member 3 by bolts 27. Opposite wing portions 21a of the bracket 21 are engaged with the holding pieces 23 to support the column 10 at the vehicle body 1. The reference numeral 30 identifies an energy absorbing member which is plastically deformed in the event of collision to absorb crashing energy. Rear end opposite portions 30a of member 30 are secured to the beam member 3 by the bolts 27. Front end opposite portions 30b thereof are secured to the upper jacket 13 by bolts 31 through mounting pieces which are not illustrated. The member 30 is provided with a plurality of slits 30c. When the front end portions 30b are pulled forward, the member 30 is plastically deformed, widening the slits 30c, and exerts an almost constant resistive force while the upper jacket 13 is moving forward. For example, in the event of a head-on crash, a driver holding the steering wheel 12 is thrown forward against the steering wheel 12 with a large impact force. If the resistive force exerted by the energy absorbing member 30 is of a safe value for the human body, impact energy is absorbed, while receiving the resistive force, thus preventing the vehicle driver from incurring serious injuries.

Figure 2:
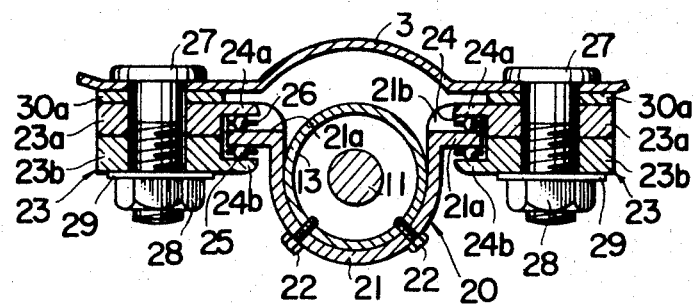
FIG. 2 is a sectional view of the steering column support assembly according to this invention taken along on the line II—II of FIG. 1.
Figure 3:
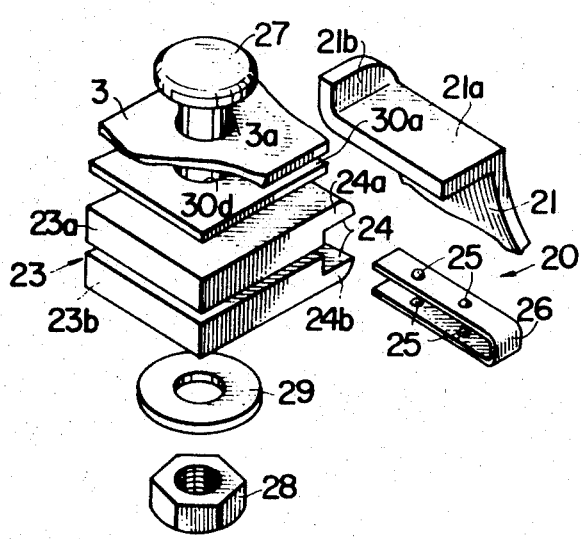
FIG. 3 is a view illustrating in exploded form the steering column support assembly of FIG. 2.

The movement of the steering column 10 in the axial direction under the normal running condition can be prevented to a certain degree by means of the energy absorbing member 30. The action of the member 30 is, however, not so reliable for this purpose. Consequently, another connecting means for preventing the movement of the column 10 in the axial direction is required. A supporting unit 20 enabling such connection is shown in FIGS. 2 and 3. The unit 20 comprises the bracket 21 of U-shaped cross section and having wing portions 21a at opposite ends thereof, the holding pieces 23 for holding the wing portions 21a, steel balls (or rollers) 25 disposed in grooves formed in holding pieces 23, bolts 27 and nuts 28 for securing the holding pieces 23 to the beam member 3. As already described, the bracket 21 is brought into contact with the lower surface of the upper jacket 13 of the steering column 10 and is fixed by the bolts 22. Each holding piece 23 consists of two portions 23a and 23b, which are provided with rims or flanges 24a and 24b, respectively, thereby forming the groove 24. The steel balls 25 are retained in holes or recesses in a U-shaped retainer 26.

The supporting unit 20 of the above-described construction is assembled as follows. Firstly, the retainer 26 carrying the steel balls 25 is engaged with the wing portion 21a of the bracket 21. The upper half portion 23a of the holding piece 23 is attached to the lower end of the bolt 27 which has been passed through the hole 3a of the beam member 3 and the hole 30d of the energy absorbing member 30. The wing portion 21a of the bracket 21, having the steel balls 25 and the retainer 26, is brought into contact with the lower surface of the rim 24a. Then, the lower half portion 23b is engaged over the lower end of the bolt 27, and the nut 28 is tightened through a washer 29. Thus, the steel balls 25 are located above and below the wing portion 21a as shown in FIG. 2 and these steel balls 25 are pressed by means of the rims 24a and 24b of the holding pieces 23, against both the upper and the lower surfaces of the wings 21a. If the width of the groove 24 is selected to be a little smaller than the sum of the thickness of the wing portion 21a and the doubled value of the diameter of the steel balls 25, and if at least one of the wing portion 21a or the holding piece 23 is made of a material having a hardness lower than that of the steel ball 25, for example, soft steel plate, the contact surface pressure of the steel balls 25 exceeds the elastic limit of the wing portion 21a or of the holding piece 23, thus causing plastic deformation therein. Consequently, the movement of the wind portion 21a in the axial direction with respect to the holding piece 23 is prevented and a certain engaging force is developed together with the frictional force therebetween. It is apparent that this engaging force may be varied by adjusting the above-described relative dimensions.

Figure 6:
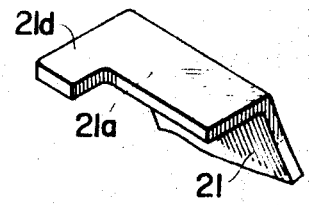
FIG. 6 is a partial perspective view of a modified form of the bracket.

A flange 21b is formed, by bending, at the front lateral side of the wing portion of the bracket 21 in order to receive without difficulty the impact force of the steering column 10 toward the rear of the vehicle, which may be developed in the event of a collision of the vehicle front with an obstacle, i.e., the primary crash. This flange 21b can be brought into contact with the front end plane of the holding piece 23. By virtue of such a simple construction, the protrusion of the steering column into the passenger compartment due to the primary crash, can be prevented. In some cases, however, a flange 21d such as shown in FIG. 6 can be used.

Figure 4:
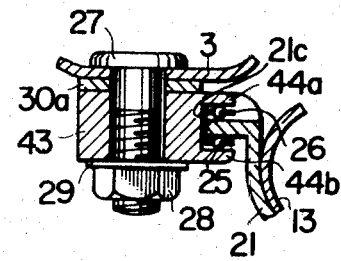
FIG. 4 is a partial sectional view of the principal part of another embodiment of the steering column support assembly according to this invention.
Figure 5:
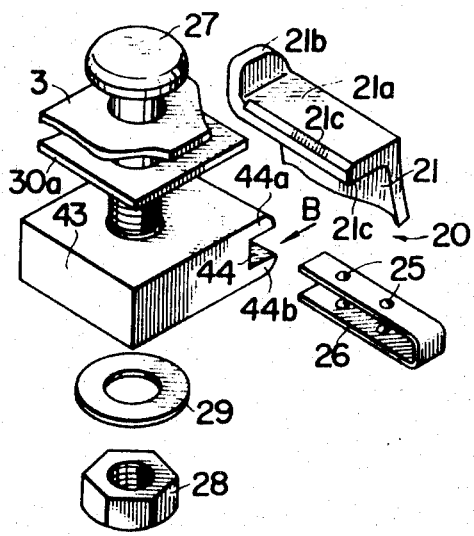
FIG. 5 is a view illustrating in exploded form the principal part of FIG. 4.

Illustrated in FIGS. 4 and 5 is an embodiment wherein a holding piece 43 which is not divided into two halves is employed. In assembling, the retainer 26 having the steel balls is inserted in a groove 44 of the holding piece 43, into which the wing portion 21a of the bracket is inserted in the direction shown by the arrow B. In order to facilitate this insertion, it is recommended to provide a chamfered portion 21c at the edge of the wing portion 21a. The reference numerals 44a and 44b identify rims or flanges which form the groove 44.

Figure 7:
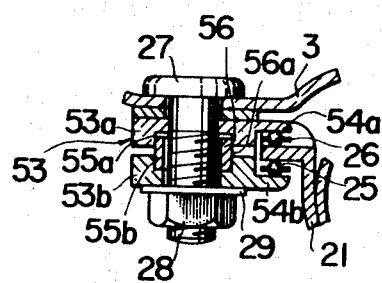
FIG. 7 is a partial sectional view of the principal part of a still another embodiment of this invention.
Figure 8:
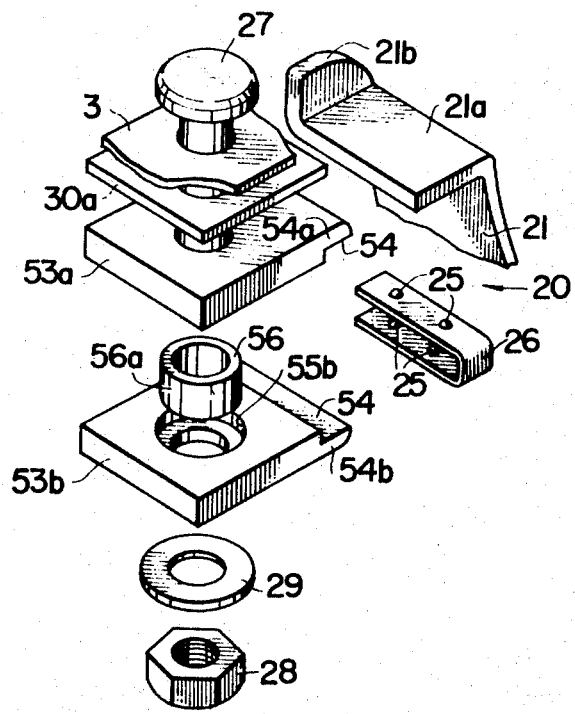
FIG. 8 is a view illustrating in exploded form the principal part of FIG. 7.

Shown in FIGS. 7 and 8 is an embodiment wherein the engaging force between a holding piece 53 and the wing portion 21a can be varied by adjusting the clamping force of the bolt 27 and the nut 28. In this case, the holding piece 53 consists of two portions 53a and 53b. The dimensions of a groove 54, the wing portion 21a and the steel balls 25 are selected so that a clearance can be provided between the confronting surfaces of the portions 53a and 53b. Each of the portions 53a and 53b is provided with a circular recess 55a and 55b, respectively, in order to prevent the parallelism between two portions 53a and 53b from being lost. Tubular spacers 56 are disposed in the circular recesses. The outer periphery 56a of each spacer is loosely fitted into the inner periphery of the associated circular recess. If the height of the spacer 56 is appropriately selected, the upper and lower end planes of the spacer 56 are brought into close contact with the bottoms of the circular recesses 55a and 55b in the clamping force adjusting range, thereby maintaining the parallelism between the two portions.

In the support assembly of this invention, the axial engaging force of the steering column is developed by the plastic deformation of the steel plate by means of the steel balls. Therefore, a stable engaging force can be maintained over a long period of time. When an engaging force larger than such stable engaging force is applied to the steering column, the wing portions 21a of the bracket 21 come out of the holding pieces 23, 43 and 53 in the axial direction. At this time, the steel balls continue to form a rolling groove, plastically deforming the surfaces of the wing portions or of the holding pieces. This plastic deforming force serves to absorb crash energy to a certain degree. It is needless to say that such a movement can be allowed only in the forward direction of the vehicle. The movement in the backward direction of the vehicle is prevented by the contact of the flanges 21b and 21d with the front end plane of the associated holding piece.

In the embodiments illustrated, the steel balls are placed at opposite surfaces of the bracket wing portion. It is possible to place the steel balls only at one surface of the wing portion and to maintain the other surface as a friction surface. It is also possible to use a roller-like rolling element instead of a steel ball. The steering column support assembly according to this invention is simple in construction and easy in assembly, and therefore it has a great practical value.

What is claimed is:

1. In automotive vehicle steering assemblies of the type including a cylindrical cross-section steering column supported, in an axially displaceable manner, in a fixed member at the passenger compartment, and energy absorbing means absorbing axial impact energy on the steering column; a steering column supporting assembly comprising, in combination, a bracket extending transversely of said steering column and formed with a semi-cylindrical offset portion intermediate its ends having a radius substantially equal to that of said steering column, said offset portion having closely embracing surface contact with said steering column; said bracket having wing portions extending from each end of said offset portion and substantially parallel to a steering shaft in said steering column; means securing said offset portion in surface to surface contact with said steering column; said fixed member providing a pair of spaced rectangular channels each receiving one of said wing portions; rolling elements interposed between both facing surfaces of each channel and the adjacent surfaces of the wing portion received in the associated channel, said rolling elements being pressed between said fixed channel surfaces and the adjacent surfaces of the associated wing portion; said rolling elements developing a resistance to relative axial displacement, of said bracket and said fixed member, by plastic deformation of at least one of said wing portion surfaces and said facing surfaces of said channels; said wing portions being formed with a flange extending traversely therefrom and operable to abut the forwardly facing end surface of said fixed member.

2. Steering column support assembly, as defined in claim 1, including means operable to adjust the pressure with which said rolling elements engage said wing portions and the facing surfaces of the associated channels.

3. Steering column support assembly as defined in claim 1, wherein said rolling elements are balls.

4. Steering column support assembly as defined in claim 1, wherein said rolling elements are rollers.

* * * * *